Patented Nov. 18, 1947

2,431,163

UNITED STATES PATENT OFFICE 2,431,163

PREPARATION OF CLARIFIED SUGAR SOLUTIONS

Robert M. Boehm, Laurel, Miss., and Horace E. Hall, Lyle, Tenn., assignors to Masonite Corporation, Laurel, Miss., a corporation of Delaware No Drawing. Application March 31, 1944, Serial No. 529,036

8 Claims. (Cl. 195—84)

This invention relates to a process for the preparation of sugar solutions in such clarified state that they are well adapted for fermentation or like treatment to produce organic compounds such as acetone, butyl alcohol, acetic acid and the like. It relates more especially to the preparation of such sugar solutions from liquors derived from wood or woody materials, hereinafter called wood liquors. The practice of the process will be described upon wood liquors obtained by expression or washing from fiber, which fiber was produced by subjecting wood chips in a gun, such as described in U. S. Patent 1,824,221 to Mason, to the hydrolyzing action of high-pressure steam, followed by explosive discharge from the gun. Such a liquor is described in U. S. Patent No. 2,224,135 to Boehm.

When sugar solutions for fermentation are prepared from such wood liquor by previously-known procedure, difficulties are encountered in the fermentation treatment thereof by the fermenting organisms being apparently poisoned by toxic compounds which are present.

It is an object of this invention to provide a process of treating wood liquors to prepare sugar solutions for fermentation by which materials toxic to fermentation are removed and the inhibition of fermentation is avoided.

A further object consists in the provision of such a process wherein a sulfide precipitation is made use of to remove materials toxic to fermentation.

The wood liquor obtained as described contains hemicellulosic materials made soluble in water by the high-pressure steam treatment. From these materials hexose and pentose sugars may be formed, and such precursors of hexose and pentose are herein referred to as hexosans and pentosans. The liquor also contains other organic materials such as soluble or dispersed tars, acetic acid, formic acid, soluble or dispersed lignin or lignin-degradation products, astringents, and various other materials, some or all of which, and especially the astringents, must be removed before sugar solutions will be obtained in condition for fermentation and the like treatment.

The presence of dispersed or colloidal material in such liquor makes extraction treatment with water-immiscible solvents, for removal of tars, organic acids and the like, difficult or impossible due to tendency toward emulsification.

The liquor is first subjected to mild hydrolysis to convert the hexosans and pentosans to sugars, as for example by cooking for about thirty to forty minutes with steam at a pressure of about 20 pounds per square inch, with addition of acid catalytic material consisting of preferably about 1% of $H_2SO_4$ by weight of the liquor, which acid, together with acids in the liquor, brings about precipitation of the dispersed or colloidal matter, and also effects the conversion of hexose and pentose precursors to hexose and pentose sugars. The mild conditions of hydrolysis avoid substantial degradation of the sugars and prevent undue formation of additional tars or of furfural, both of which are toxic to fermentation.

In order to collect and remove as much as possible of the tars which ordinarily are present or formed to some extent during the mild hydrolysis treatment, finely divided material may be added to the liquor prior to hydrolysis. Various clays and the like may be used for this purpose. The preferred fine material, however, consists of so-called sludge, or very fine solid particles of wood fiber, etc., contained in and obtainable from the waste materials from fiberboard manufacturing processes. Such sludge material is described in U. S. Patent 2,080,077 to Howard et al.

The precipitated material, together with any added sludge or other finely divided material, is removed from the liquor by filtering. The liquor is thus put into satisfactory condition for extraction by water-immiscible solvents.

The filtrate thus secured is preferably subjected to solvent extraction for removal of tars, organic acids, traces of furfural, and the like. Preferred solvents found suitable for this purpose are butyl alcohol or furfural, although other suitable water-immiscible solvents or mixtures of solvents, such as ethyl acetate-isopropyl ether may be used.

Solvent extraction is preferably carried out by counter-current washing with the solvent in a liquid-liquid extractor, and the solvent is recovered for re-use after removal and recovery of dissolved materials such as tars, acetic acid, furfural and the like. Solvents remaining dissolved in the treated liquor are desirably removed in a stripping column by means of steam and recovered for re-use in the customary manner.

The extraction and stripping treatments are preferably supplemented by treatment with activated carbon. Such treatment may be carried out by adding activated carbon in subdivided state to the liquor, followed by filtering out the carbon and adsorbed material. Used in this way, the carbon can be cleaned and re-used, if desired. If desired, this treatment with carbon can be performed in whole or in part at a later stage, as will be described later.

At this stage the liquor is acidic, having for example a pH of about 3 to 4 due to the presence of the acid such as $H_2SO_4$ used for catalyzing the hydrolysis treatment. It also contains materials which are toxic to fermentation, and which may include tannins or other materials that are apparently of astringent character, as indicated by a bitter or puckery taste. Such toxic materials will be referred to as astringents. If fermentation of the liquor is attempted at this stage, satisfactory results are not obtained apparently due to presence of toxic materials, especially astringents.

By the present invention such liquors are prepared for fermentation by a treatment consisting in adding to the acid liquor a metal, such as iron or aluminum, preferably in subdivided state, or a salt of the metal, followed by the addition of alkaline material, preferably lime, and then, if desired, subjecting the liquor to a further treatment with $H_2S$.

The metals or salts thereof will react with the sulfuric acid to form water-soluble metal sulfates. Following the introduction of the metal or salt, sufficient alkaline material, preferably lime, is added to bring the liquor to the alkaline side, as to a pH of about 7.5 to 8.5. Any materially higher alkalinity than pH of about 8 is to be avoided because it may cause redissolving of the precipitate.

This treatment results in a voluminous precipitation of the metal hydroxide, together with calcium sulfate. Upon filtering out this precipitate, which is comparatively gelatinous, the liquor is found to be substantially free from previous bitter or puckery taste and in improved condition for fermentation. Whether under these conditions there is a reaction between the metal and the organic astringent materials, or whether the astringent materials are carried down mechanically with the precipitate above referred to, or both, is not known, but in any event the described improvement in the liquor is attained. If the liquor is to be subjected to fermentation at this stage, its pH is preferably adjusted to the point best adapted for fermentation.

However, traces of metals or metallic salts may remain in the liquor after the treatment with metal or metal salts and alkaline material, as lime, and the astringents may not have been altogether eliminated. It is preferable, therefore, before proceeding to ferment, to give the alkaline liquor a treatment with $H_2S$. Upon the liquor being so treated, a dark precipitate is formed. Upon filtering out such precipitate, a light-colored fermentable filtrate is secured which is thoroughly free from bitter or puckery taste and better adapted for fermentation purposes. It is believed that this dark precipitated material includes complex metallic salts of the organic astringents, tanning, and the like which remained in the alkaline solution, together with metal sulfides. Before subjection to fermentation the pH is suitably adjusted and the liquor diluted to the concentration desired for the fermentation.

We claim:

1. The process of clarifying wood liquors, obtained through acid hydrolysis of wood, for fermentation, which comprises subjecting the liquor to acid hydrolysis, washing the liquor with a water-immiscible organic solvent containing a compound chosen from the group consisting of butyl alcohol, furfural and isopropyl ether, heating the liquor to remove excess organic solvent, adding metal chosen from the group consisting of iron and aluminum to the acid liquor in sufficient quantity to react with the acid in the liquor, adding lime in sufficient quantity to raise the pH of the solution to between 7 and 8.5 which precipitates astringent materials toxic to fermentation, and removing the precipitate from the clarified liquor.

2. The process as defined in claim 1, and in which the clarified liquor is further treated with hydrogen sulfide and the resulting precipitate removed.

3. The process as defined in claim 1, and in which the added metal is in a finely divided form.

4. The process as defined in claim 1, and in which the added metal is in the form of a metal salt which will react with the acid in the liquor.

5. Process of clarifying wood liquors, obtained through acid hydrolysis of wood, containing pentosans and hexosans to provide sugar liquors freed from materials which are toxic to fermentation, which comprises subjecting the wood liquor to hydrolysis in the presence of a mineral acid to form pentose and hexose sugars, washing the liquor with a water-immiscible organic solvent containing a compound chosen from the group consisting of butyl alcohol, furfural and isopropyl ether, heating the liquor to remove excess organic solvent, adding metal chosen from the group consisting of iron and aluminum to the acid liquor in sufficient quantity to react with the acid in the liquor, adding lime in sufficient quantity to raise the pH of the sugar solution to between about 7 and 8.5 which precipitates astringent materials toxic to fermentation, and removing the precipitate from the clarified liquor.

6. The process as defined in claim 5, and in which the clarified liquor is further treated with hydrogen sulfide and the resulting precipitate removed.

7. The process as defined in claim 5, and in which the added metal is in a finely divided form.

8. The process as defined in claim 5, and in which the added metal is in the form of a metal salt which will react with the acid in the liquor.

ROBERT M. BOEHM.
HORACE E. HALL.

REFERENCES CITED

The following references are of record in the file of this patent:

UNITED STATES PATENTS

| Number | Name | Date |
|---|---|---|
| 930,274 | Doughty | Aug. 3, 1900 |
| 2,203,360 | Partonsky | June 4, 1940 |
| 1,888,935 | Placek | Nov. 22, 1932 |
| 1,497,672 | Dickerson | June 17, 1924 |
| 1,080,970 | Honig | Dec. 9, 1913 |
| 2,284,500 | Worth | May 26, 1942 |
| 2,031,670 | Reich | Feb. 25, 1936 |
| 1,832,375 | Franck | Nov. 17, 1931 |

OTHER REFERENCES

Satow—Researches In Oil & Proteids Extraction From Soy-Bean, Ch. XV, page 164.

Schroke—Tech. Assn. Papers, Series IX, No. 69, 1919. Abstract D. R. P. 307, 383 and the addition Patent 310, 318 E. Jacoby, page 151.

Carbide & Carbon—Synth. Org. Chem., 10th edition.